(12) United States Patent
Lin

(10) Patent No.: US 10,892,856 B2
(45) Date of Patent: Jan. 12, 2021

(54) METHOD FOR DETERMINING HARQ NUMBER AND NETWORK DEVICE

(71) Applicant: Guangdong OPPO Mobile Telecommunications Corp., Ltd., Guangdong (CN)

(72) Inventor: Yanan Lin, Dongguan (CN)

(73) Assignee: Guangdong OPPO Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 16/869,437

(22) Filed: May 7, 2020

(65) Prior Publication Data

US 2020/0266938 A1  Aug. 20, 2020

Related U.S. Application Data

(63) Continuation of application No. PCT/CN2017/110583, filed on Nov. 10, 2017.

(51) Int. Cl.
| | |
|---|---|
| *H04L 1/18* | (2006.01) |
| *H04W 72/04* | (2009.01) |
| *H04W 76/11* | (2018.01) |
| *H04W 76/27* | (2018.01) |
| *H04L 1/16* | (2006.01) |

(52) U.S. Cl.
CPC .......... *H04L 1/1812* (2013.01); *H04L 1/1642* (2013.01); *H04L 1/1819* (2013.01); *H04W 72/04* (2013.01); *H04W 72/0446* (2013.01); *H04W 76/11* (2018.02); *H04W 76/27* (2018.02)

(58) Field of Classification Search
None
See application file for complete search history.

(56) References Cited

U.S. PATENT DOCUMENTS

2018/0176945 A1*  6/2018  Cao .................. H04L 1/1864

FOREIGN PATENT DOCUMENTS

| CN | 101132262 A | 2/2008 |
|---|---|---|
| CN | 101651529 A | 2/2010 |
| CN | 102160318 A | 8/2011 |
| CN | 103326834 A | 9/2013 |
| CN | 103648175 A | 3/2014 |

(Continued)

OTHER PUBLICATIONS

International Application No. PCT/CN2017/110583, International search report, dated Apr. 3, 2018, 3 pages.

(Continued)

*Primary Examiner* — Alex Skripnikov
*Assistant Examiner* — Richard Schnell
(74) *Attorney, Agent, or Firm* — Kilpatrick Townsend & Stockton LLP

(57) ABSTRACT

A method for determining a hybrid automatic repeat request (HARQ) identifier (ID) includes determining, by the network device, a HARQ ID based on a time domain resource sequence number of a current transmission, the number of HARQ processes, and at least one of the time domain resource configuration information, a HARQ ID offset, or a number of transmission times of the current transport TB. The method also includes receiving, by the network device, the TB from a terminal on the non-dynamic resource according to the HARQ ID.

12 Claims, 12 Drawing Sheets

---

A network device determines a time domain resource sequence number of a current transmission and a quantity of HARQ processes, and determines at least one type of information of time domain resource configuration information, a HARQ ID offset or a quantity of transmission times of a current transport TB — 101

Determine a HARQ ID based on the time domain resource sequence number of the current transmission, the quantity of HARQ processes, and the at least one type of information of the time domain resource configuration information, the HARQ ID offset or the quantity of transmission times of the current transport TB — 102

(56) References Cited

FOREIGN PATENT DOCUMENTS

CN         106301711 A     1/2017
WO       2010064805 A2   6/2010

OTHER PUBLICATIONS

International Application No. PCT/CN2018/114444, International search report, dated Jan. 21, 2019, 2 pages.
European Patent Application No. 17931254.1 European search report dated Sep. 1, 2020, 7 pages.
Huawei et al., R1-1717091 "UL data transmission procedure with and without UL grant", Oct. 9-13, 2017, 17 pages.
Intel Corporation, R1-1717396 "UL data transmission procedures in NR", Oct. 9-13, 2017, 12 pages.
Huawei et al., R2-1711431 "HARQ and Transmission for Type 1 Grant-Free for Active UE", Oct. 9-13, 2017, 5 pages.
Zte, R2-1706645 "Consideration on the multiple SPS and grant free", Jun. 27-29, 2017, 5 pages.
European Patent Application No. 18875124.2, European search report dated Nov. 18, 2020, 9 pages.

* cited by examiner

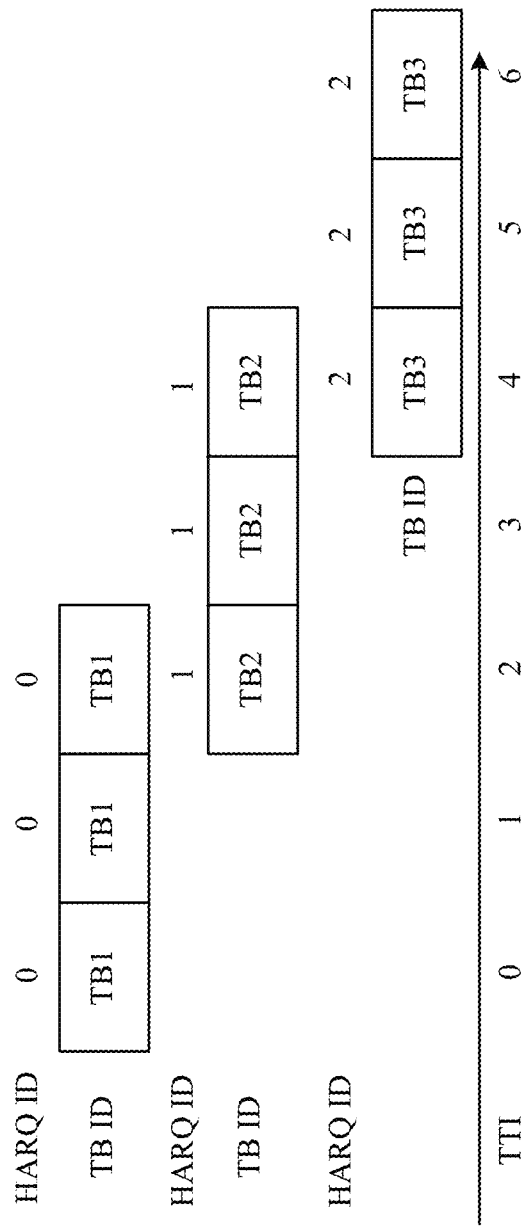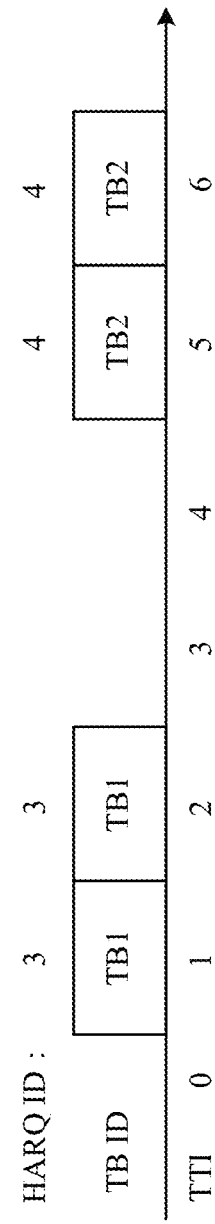
FIG. 6A
FIG. 6B

US 10,892,856 B2

METHOD FOR DETERMINING HARQ NUMBER AND NETWORK DEVICE

CROSS-REFERENCE TO RELATED APPLICATION

This application is a continuation of and claims priority to International Patent Application No. PCT/CN2017/110583, filed on Nov. 10, 2017, the contents of which is hereby incorporated by reference in its entirety.

BACKGROUND OF THE INVENTION

Technical Field

The present invention relates to wireless communications technologies, and specifically, to a method for determining a hybrid automatic repeat request (HARQ) identifier (ID), a network device, a terminal, and a computer storage medium.

Related Art

An Ultra-Reliable Low Latency Communication (URLLC, Ultra-Reliable Low Latency Communication) service is introduced into a current 5G system. A feature of the service is to implement ultra-reliable (for example, 99.999%) transmission with an extreme latency (for example, 1 ms). A concept of Grant free is put forward to achieve the objective. Grant free uses a pre-configured/semi-persistent resource configuration mode, and a terminal can perform transmission on a configured resource according to a service requirement. This technology avoids a schedule request (SR, Schedule Request) process and a buffer status report (BSR, Buffer Status Report) process, and increases an effective transmission time of the terminal.

A HARQ is usually implemented in a "stop-wait" manner. For a HARQ process, the process temporarily suspends transmission during the wait for an ACK/NACK feedback. After feedback/scheduling signaling is received, it is chosen according to a feedback result/scheduling information to send new data or retransmit old data. To ensure system transmission efficiency, the HARQ uses a plurality of processes. That is, during the wait for a feedback/scheduling in a process, transmission is performed in the remaining processes. To avoid confusion of data among the plurality of processes, a HARQ ID is used to represent a HARQ process.

In a Long Term Evolution (LTE) system, a HARQ ID is obtained by calculation based on a Transmission Time Interval (TTI, Transmission Time Interval) ID, a period, and a quantity of processes. However, in a 5G system, if retransmission is used in a Grant free mechanism, a HARQ may be inaccurately indicated. For example, different HARQ IDs are obtained by repeated calculation for a same transport block (TB). In this case, one TB corresponds to a plurality of processes. As a result, efficiency of retransmission combining is reduced, and different TBs are incorrectly combined.

SUMMARY OF THE INVENTION

To resolve the existing technical problems, embodiments of the present invention provide a method for determining a HARQ ID, a network device, a terminal, and a computer storage medium.

An embodiment of the present invention provides a method for determining a HARQ ID, including determining, by a network device, a time domain resource sequence number of a current transmission and a number of HARQ processes, and determining at least one type of information of time domain resource configuration information, a HARQ ID offset or a quantity of transmission times of a current transport TB, where the time domain resource configuration information includes a time domain resource offset and/or a time domain resource period of non-dynamic resource configuration; and determining, by the network device, a HARQ ID based on the time domain resource sequence number of the current transmission, the number of HARQ processes, and the at least one type of information of the time domain resource configuration information, the HARQ ID offset or the quantity of transmission times of the current transport TB.

In an embodiment, the determining, by the network device, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the network device, the HARQ ID based on the time domain resource sequence number of the current transmission, the time domain resource offset, the time domain resource period, and the number of HARQ processes.

In an embodiment, the determining, by the network device, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the network device, the HARQ ID based on the time domain resource sequence number of the current transmission, the time domain resource offset, the time domain resource period, the number of HARQ processes, and the HARQ ID offset.

In an embodiment, the determining, by the network device, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the network device, the HARQ ID based on the time domain resource sequence number of the current transmission, the time domain resource period, the number of HARQ processes, and the HARQ ID offset.

In an embodiment, the determining, by the network device, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the network device, the HARQ ID based on the time domain resource sequence number of the current transmission, the time domain resource offset, the quantity of transmission times of the current transport TB, the time domain resource period, the number of HARQ processes, and the HARQ ID offset.

In an embodiment, the determining, by the network device, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the network device, the HARQ ID based on the time domain resource sequence number of the current transmission, the quantity of transmission times of the current transport TB, the time domain resource period, the number of HARQ processes, and the HARQ ID offset.

In an embodiment, the determining, by the network device, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the network device, the HARQ ID based on the time domain resource sequence number of the current transmission, the quantity of transmission times of the current transport TB, the time domain resource period, and the number of HARQ processes.

In an embodiment, the determining, by the network device, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the network device, the HARQ ID based on the time domain resource sequence number of the current transmission, the time domain resource offset, the quantity of transmission times of the current transport TB, the time domain resource period, and the number of HARQ processes.

In an embodiment, the unit of the time domain resource offset is the same as or different from an absolute time length of a transmission.

In an embodiment, the unit of the time domain resource period is the same as or different from an absolute time length of a transmission.

In an embodiment, the method further includes: sending, by the network device, signaling to a terminal, where the signaling carries at least one type of information of the number of HARQ processes, the time domain resource configuration information, and the HARQ ID 25 offset; and the signaling includes one piece of radio resource control (RRC) signaling, higher layer signaling or physical layer signaling.

An embodiment of the present invention further provides a method for determining a HARQ ID, including: determining, by a terminal, a time domain resource sequence number of a current transmission and a number of HARQ processes, and determining at least one type of information of time domain resource configuration information, a HARQ ID offset or a quantity of transmission times of a current transport TB, where the time domain resource configuration information includes a time domain resource offset and/or a time domain resource period; and determining, by the terminal, a HARQ ID based on the time domain resource sequence number of the current transmission, the number of HARQ processes, and the at least one type of information of the time domain resource configuration information, the HARQ ID offset or the quantity of transmission times of the current transport TB.

In an embodiment, the method further includes: receiving, by the terminal, signaling from a network device, and determining, based on the signaling, at least one type of the following information: the number of HARQ processes, the time domain resource configuration information, and the HARQ ID offset, where the signaling includes one piece of RRC signaling, higher layer signaling or physical layer signaling.

In an embodiment, the determining, by the terminal, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the terminal, the HARQ ID based on the time domain resource sequence number of the current transmission, the time domain resource offset, the time domain resource period, and the number of HARQ processes.

In an embodiment, the determining, by the terminal, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the terminal, the HARQ ID based on the time domain resource sequence number of the current transmission, the time domain resource offset, the time domain resource period, the number of HARQ processes, and the HARQ ID offset.

In an embodiment, the determining, by the terminal, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the terminal, the HARQ ID based on the time domain resource sequence number of the current transmission, the time domain resource period, the number of HARQ processes, and the HARQ ID offset.

In an embodiment, the determining, by the terminal, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the terminal, the HARQ ID based on the time domain resource sequence number of the current transmission, the time domain resource offset, the quantity of transmission times of the current transport TB, the time domain resource period, the number of HARQ processes, and the HARQ ID offset.

In an embodiment, the determining, by the terminal, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the terminal, the HARQ ID based on the time domain resource sequence number of the current transmission, the quantity of transmission times of the current transport TB, the time domain resource period, the number of HARQ processes, and the HARQ ID offset.

In an embodiment, the determining, by the terminal, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the terminal, the HARQ ID based on the time domain resource sequence number of the current transmission, the quantity of transmission times of the current transport TB, the time domain resource period, and the number of HARQ processes.

In an embodiment, the determining, by the terminal, a HARQ ID based on the time domain resource sequence number of the current transmission, the number of HARQ processes, and the at least one type of information of the time domain resource configuration information, the HARQ ID offset or the quantity of transmission times of the current transport TB includes: determining, by the terminal, the HARQ ID based on the time domain resource sequence number of the current transmission, the time domain resource offset, the quantity of transmission times of the current transport TB, the time domain resource period, and the number of HARQ processes.

In an embodiment, the unit of the time domain resource offset is the same as or different from an absolute time length of a transmission.

In an embodiment, the unit of the time domain resource period is the same as or different from an absolute time length of a transmission.

An embodiment of the present invention further provides a network device, including a first determining unit and a second determining unit, where the first determining unit is configured to: determine a time domain resource sequence number of a current transmission and a number of HARQ processes, and determine at least one type of information of time domain resource configuration information, a HARQ ID offset or a quantity of transmission times of a current transport TB, where the time domain resource configuration information includes a time domain resource offset and/or a time domain resource period of non-dynamic resource configuration; and the second determining unit is configured to determine a HARQ ID based on the time domain resource sequence number of the current transmission, the number of HARQ processes, and the at least one type of information of the time domain resource configuration information, the HARQ ID offset or the quantity of transmission times of the current transport TB that are determined by the first determining unit.

In an embodiment, the second determining unit is configured to determine the HARQ ID based on the time domain resource sequence number of the current transmission, the time domain resource offset, the time domain resource period, and the number of HARQ processes.

In an embodiment, the second determining unit is configured to determine the HARQ ID based on the time domain resource sequence number of the current transmission, the time domain resource offset, the time domain resource period, the number of HARQ processes, and the HARQ ID offset.

In an embodiment, the second determining unit is configured to determine the HARQ ID based on the time domain resource sequence number of the current transmission, the time domain resource period, the number of HARQ processes, and the HARQ ID offset.

In an embodiment, the second determining unit is configured to determine the HARQ ID based on the time domain resource sequence number of the current transmission, the time domain resource offset, the quantity of transmission times of the current transport TB, the time domain resource period, the number of HARQ processes, and the HARQ ID offset.

In an embodiment, the second determining unit is configured to determine the HARQ ID based on the time domain resource sequence number of the current transmission, the quantity of transmission times of the current transport TB, the time domain resource period, the number of HARQ processes, and the HARQ ID offset.

In an embodiment, the second determining unit is configured to determine the HARQ ID based on the time domain resource sequence number of the current transmission, the quantity of transmission times of the current transport TB, the time domain resource period, and the number of HARQ processes.

In an embodiment, the second determining unit is configured to determine the HARQ ID based on the time domain resource sequence number of the current transmission, the time domain resource offset, the quantity of transmission times of the current transport TB, the time domain resource period, and the number of HARQ processes.

In an embodiment, the unit of the time domain resource offset is the same as or different from an absolute time length of a transmission.

In an embodiment, the unit of the time domain resource period is the same as or different from an absolute time length of a transmission.

In an embodiment, the network device further includes a sending unit, configured to send signaling to a terminal, where the signaling carries at least one type of information of the number of HARQ processes, the time domain resource configuration information, and the HARQ ID offset; and the signaling includes one piece of RRC signaling, higher layer signaling or physical layer signaling.

An embodiment of the present invention further provides a terminal, including a third determining unit and a fourth determining unit, where the third determining unit is configured to: determine a time domain resource sequence number of a current transmission and a number of HARQ processes, and determine at least one type of information of time domain resource configuration information, a HARQ ID offset or a quantity of transmission times of a current transport TB, where the time domain resource configuration information includes a time domain resource offset and/or a time domain resource period; and the fourth determining unit is configured to determine a HARQ ID based on the time domain resource sequence number of the current transmission, the number of HARQ processes, and the at least one type of information of the time domain resource configuration information, the HARQ ID offset or the quantity of transmission times of the current transport TB that are determined by the third determining unit.

In an embodiment, the terminal further includes a receiving unit, configured to receive signaling from a network device, and the signaling includes one piece of RRC signaling, higher layer signaling or physical layer signaling; and the third determining unit is configured to determine, based on the signaling received by the receiving unit, at least one type of the following information: the number of HARQ processes, the time domain resource configuration information, and the HARQ ID offset.

In an embodiment, the fourth determining unit is configured to determine the HARQ ID based on the time domain resource sequence number of the current transmission, the time domain resource offset, the time domain resource period, and the number of HARQ processes.

In an embodiment, the fourth determining unit is configured to determine the HARQ ID based on the time domain resource sequence number of the current transmission, the time domain resource offset, the time domain resource period, the number of HARQ processes, and the HARQ ID offset.

In an embodiment, the fourth determining unit is configured to determine the HARQ ID based on the time domain resource sequence number of the current transmission, the time domain resource period, the number of HARQ processes, and the HARQ ID offset.

In an embodiment, the fourth determining unit is configured to determine the HARQ ID based on the time domain resource sequence number of the current transmission, the time domain resource offset, the quantity of transmission times of the current transport TB, the time domain resource period, the number of HARQ processes, and the HARQ ID offset.

In an embodiment, the fourth determining unit is configured to determine the HARQ ID based on the time domain resource sequence number of the current transmission, the quantity of transmission times of the current transport TB, the time domain resource period, the number of HARQ processes, and the HARQ ID offset.

In an embodiment, the fourth determining unit is configured to determine the HARQ ID based on the time domain resource sequence number of the current transmission, the quantity of transmission times of the current transport TB, the time domain resource period, and the number of HARQ processes.

In an embodiment, the fourth determining unit is configured to determine the HARQ ID based on the time domain resource sequence number of the current transmission, the time domain resource offset, the quantity of transmission times of the current transport TB, the time domain resource period, and the number of HARQ processes.

In an embodiment, the unit of the time domain resource offset is the same as or different from an absolute time length of a transmission.

In an embodiment, the unit of the time domain resource period is the same as or different from an absolute time length of a transmission.

An embodiment of the present invention further provides a network device, including a memory, a processor, and a computer program that is stored on the memory and that can be run on the processor, where the processor, when executing the program, implements the steps of the method for determining a HARQ ID that is applied to a network device according to the embodiments of the present invention.

An embodiment of the present invention further provides a terminal, including a memory, a processor, and a computer program that is stored on the memory and that can be run on the processor, where the processor, when executing the program, implements the steps of the method for determining a HARQ ID that is applied to a terminal according to the embodiments of the present invention.

An embodiment of the present invention further provides a computer storage medium, storing a computer instruction, where the instruction, when executed by a processor, implements the steps of the method for determining a HARQ ID that is applied to a network device according to the embodiments of the present invention; or the instruction, when executed by a processor, implements the steps of the method for determining a HARQ ID that is applied to a terminal according to the embodiments of the present invention.

The embodiments of the present invention provide a method for determining a HARQ ID, a network device, a terminal, and a computer storage medium. The method includes: determining, by a network device, a time domain resource sequence number of a current transmission and a number of HARQ processes, and determining at least one type of information of time domain resource configuration information, a HARQ ID offset or a quantity of transmission times of a current transport TB, where the time domain resource configuration information includes a time domain resource offset and/or a time domain resource period of non-dynamic resource configuration; and determining, by the network device, a HARQ ID based on the time domain resource sequence number of the current transmission, the number of HARQ processes, and the at least one type of information of the time domain resource configuration information, the HARQ ID offset or the quantity of transmission times of the current transport TB. By means of the technical solutions of the embodiments of the present invention, a HARQ ID is determined by combining at least one type of information of time domain resource configuration information used as a non-dynamic resource, a HARQ ID offset or a quantity of transmission times of a current transport TB with a time domain resource sequence number of a current transmission and a number of HARQ processes, to avoid that one same TB corresponds to a plurality of HARQ IDs due to a plurality of retransmissions in a Grant free mechanism, so that one TB corresponds to one process, thereby avoiding a waste of a HARQ process IDs, avoiding incorrect combination of different TBs, and improving efficiency of retransmission combining.

BRIEF DESCRIPTION OF THE DRAWINGS

FIG. 6A and FIG. 6B are schematic diagrams of a fourth application of a method for determining a HARQ ID according to an embodiment of the present invention;

DETAILED DESCRIPTION OF THE INVENTION

The following further describes the present invention in detail with reference to the accompanying drawings and specific embodiments.

Embodiment 1

Figure 1:
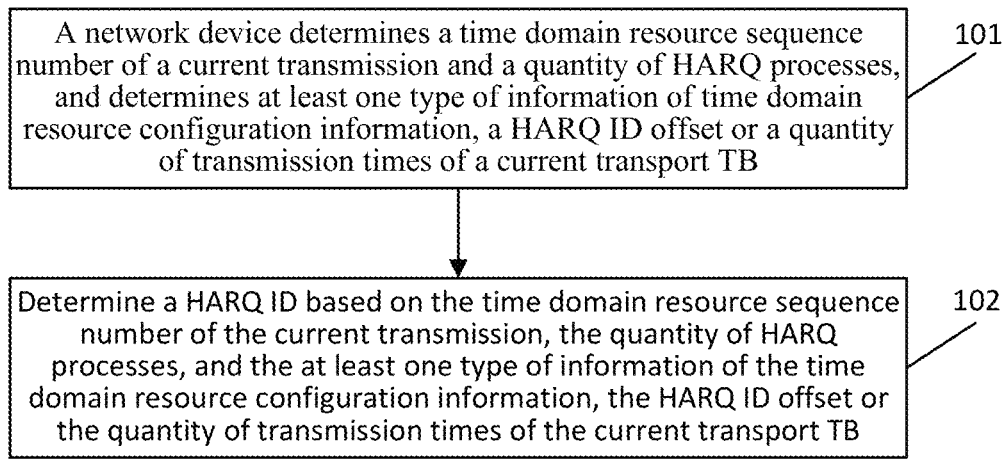
FIG. 1 is a schematic flowchart of a method for determining a HARQ ID according to Embodiment 1 of the present invention.

This embodiment of the present invention provides a method for determining a HARQ ID. FIG. 1 is a schematic flowchart of a method for determining a HARQ ID according to Embodiment 1 of the present invention. As shown in FIG. 1, the method includes:

Step 101: A network device determines a time domain resource sequence number of a current transmission and a number of HARQ processes, and determines at least one type of information of time domain resource configuration information, a HARQ ID offset or a quantity of transmission times of a current transport TB, where the time domain resource configuration information includes a time domain resource offset and/or a time domain resource period of non-dynamic resource configuration.

Step 102: The network device determines a HARQ ID based on the time domain resource sequence number of the current transmission, the number of HARQ processes, and the at least one type of information of the time domain resource configuration information, the HARQ ID offset or the quantity of transmission times of the current transport TB.

In this embodiment of the present invention, the time domain resource sequence number may be any one of a radio frame number, a subframe number, a slot number, and a symbol number.

In a first implementation, the network device determines a time domain resource sequence number of a current transmission, a time domain resource offset, a time domain resource period, and a number of HARQ processes, and then determines a HARQ ID based on the time domain resource sequence number of the current transmission, the time domain resource offset, the time domain resource period, and the number of HARQ processes.

In a second implementation, the network device determines a time domain resource sequence number of a current transmission, a time domain resource offset, a time domain resource period, a number of HARQ processes, and a HARQ ID offset, and then determines a HARQ ID based on the time domain resource sequence number of the current transmission, the time domain resource offset, the time domain resource period, and the number of HARQ processes.

In a third implementation, the network device determines a time domain resource sequence number of a current transmission, a time domain resource period, a number of HARQ processes, and a HARQ ID offset, and determines a HARQ ID based on the time domain resource sequence number of the current transmission, the time domain resource period, the number of HARQ processes, and the HARQ ID offset.

In a fourth implementation, the network device determines a time domain resource sequence number of a current transmission, a time domain resource offset, a quantity of transmission times of a current transport TB, a time domain resource period, a number of HARQ processes, and a HARQ ID offset, and determines a HARQ ID based on the time domain resource sequence number of the current transmission, the time domain resource offset, the quantity of transmission times of the current transport TB, the time domain resource period, the number of HARQ processes, and the HARQ ID offset.

In a fifth implementation, the network device determines a time domain resource sequence number of a current transmission, a quantity of transmission times of a current transport TB, a time domain resource period, a number of HARQ processes, and a HARQ ID offset, and determines a HARQ ID based on the time domain resource sequence number of the current transmission, the quantity of transmission times of the current transport TB, the time domain resource period, the number of HARQ processes, and the HARQ ID offset.

In a sixth implementation, the network device determines a time domain resource sequence number of a current transmission, a quantity of transmission times of a current transport TB, a time domain resource period, and a number of HARQ processes, and determines a HARQ ID based on the time domain resource sequence number of the current transmission, the quantity of transmission times of the current transport TB, the time domain resource period, and the number of HARQ processes.

In a seventh implementation, the network device determines a time domain resource sequence number of a current transmission, a quantity of transmission times of a current transport TB, a time domain resource period, and a number of HARQ processes, and determines a HARQ ID based on the time domain resource sequence number of the current transmission, the time domain resource offset, the quantity of transmission times of the current transport TB, the time domain resource period, and the number of HARQ processes.

In this embodiment of the present invention, the unit of the time domain resource offset is the same as or different from an absolute time length of a transmission.

In this embodiment of the present invention, the unit of the time domain resource period is the same as or different from an absolute time length of a transmission.

By means of the technical solutions of the embodiments of the present invention, a HARQ ID is determined by combining at least one type of information of time domain resource configuration information used as a non-dynamic resource, a HARQ ID offset or a quantity of transmission times of a current transport TB with a time domain resource sequence number of a current transmission and a number of HARQ processes, to avoid that one same TB corresponds to a plurality of HARQ IDs due to a plurality of retransmissions in a Grant free mechanism, so that one TB corresponds to one process, thereby avoiding a waste of a HARQ process IDs, avoiding incorrect combination of different TBs, and improving efficiency of retransmission combining.

Embodiment 2

Figure 2:
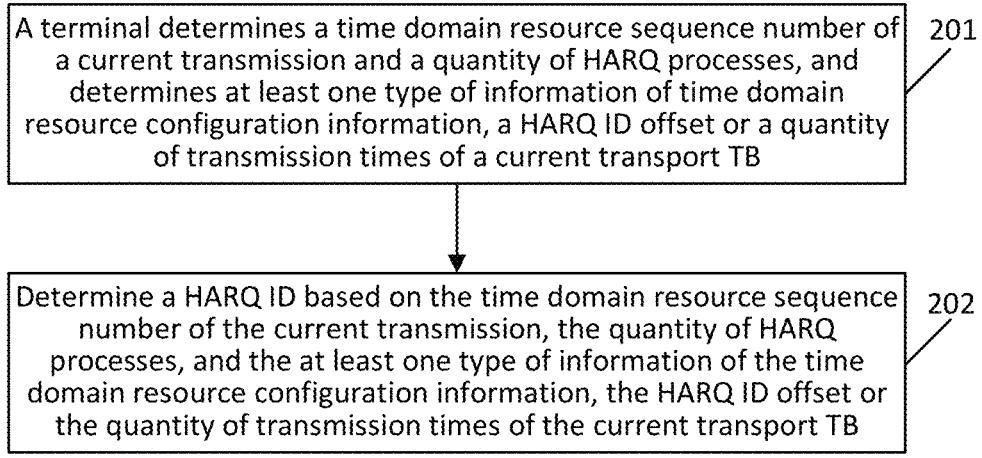
FIG. 2 is a schematic flowchart of a method for determining a HARQ ID according to Embodiment 2 of the present invention.

This embodiment of the present invention further provides a method for determining a HARQ ID. FIG. 2 is a schematic flowchart of a method for determining a HARQ ID according to Embodiment 2 of the present invention. As shown in FIG. 2, the method includes:

Step 201: A terminal determines a time domain resource sequence number of a current transmission and a number of HARQ processes, and determines at least one type of information of time domain resource configuration information, a HARQ ID offset or a quantity of transmission times of a current transport TB, where the time domain resource configuration information includes a time domain resource offset and/or a time domain resource period.

Step 202: The terminal determines a HARQ ID based on the time domain resource sequence number of the current transmission, the number of HARQ processes, and the at least one type of information of the time domain resource configuration information, the HARQ ID offset or the quantity of transmission times of the current transport TB.

In this embodiment of the present invention, the time domain resource sequence number may be any one of a radio frame number, a subframe number, a slot number, and a symbol number.

In this embodiment of the present invention, the method further includes: receiving, by the terminal, signaling from a network device, and determining, based on the signaling, at least one type of the following information: the number of HARQ processes, the time domain resource configuration information, and the HARQ ID offset, where the signaling includes one piece of RRC signaling, higher layer signaling or physical layer signaling.

In a first implementation, the terminal determines a time domain resource sequence number of a current transmission, a time domain resource offset, a time domain resource period, and a number of HARQ processes, and then determines a HARQ ID based on the time domain resource sequence number of the current transmission, the time domain resource offset, the time domain resource period, and the number of HARQ processes.

In a second implementation, the terminal determines a time domain resource sequence number of a current transmission, a time domain resource offset, a time domain resource period, a number of HARQ processes, and a HARQ ID offset, and then determines a HARQ ID based on the time domain resource sequence number of the current transmission, the time domain resource offset, the time domain resource period, and the number of HARQ processes.

In a third implementation, the terminal determines a time domain resource sequence number of a current transmission, a time domain resource period, a number of HARQ processes, and a HARQ ID offset, and determines a HARQ ID based on the time domain resource sequence number of the current transmission, the time domain resource period, the number of HARQ processes, and the HARQ ID offset.

In a fourth implementation, the terminal determines a time domain resource sequence number of a current transmission, a time domain resource offset, a quantity of transmission times of a current transport TB, a time domain resource period, a number of HARQ processes, and a HARQ ID offset, and determines a HARQ ID based on the time domain resource sequence number of the current transmission, the time domain resource offset, the quantity of transmission times of the current transport TB, the time domain resource period, the number of HARQ processes, and the HARQ ID offset.

In a fifth implementation, the terminal determines a time domain resource sequence number of a current transmission, a quantity of transmission times of a current transport TB, a time domain resource period, a number of HARQ processes, and a HARQ ID offset, and determines a HARQ ID based on the time domain resource sequence number of the current transmission, the quantity of transmission times of the current transport TB, the time domain resource period, the number of HARQ processes, and the HARQ ID offset.

In a sixth implementation, the terminal determines a time domain resource sequence number of a current transmission, a quantity of transmission times of a current transport TB, a time domain resource period, and a number of HARQ processes, and determines a HARQ ID based on the time domain resource sequence number of the current transmission, the quantity of transmission times of the current transport TB, the time domain resource period, and the number of HARQ processes.

In a seventh implementation, the terminal determines a time domain resource sequence number of a current transmission, a quantity of transmission times of a current transport TB, a time domain resource period, and a number of HARQ processes, and determines a HARQ ID based on the time domain resource sequence number of the current transmission, the time domain resource offset, the quantity of transmission times of the current transport TB, the time domain resource period, and the number of HARQ processes.

In this embodiment of the present invention, the unit of the time domain resource offset is the same as or different from an absolute time length of a transmission.

In this embodiment of the present invention, the unit of the time domain resource period is the same as or different from an absolute time length of a transmission.

By means of the technical solutions of the embodiments of the present invention, a HARQ ID is determined by combining at least one type of information of time domain resource configuration information used as a non-dynamic resource, a HARQ ID offset or a quantity of transmission times of a current transport TB with a time domain resource sequence number of a current transmission and a number of HARQ processes, to avoid that one same TB corresponds to a plurality of HARQ IDs due to a plurality of retransmissions in a Grant free mechanism, so that one TB corresponds to one process, thereby avoiding a waste of a HARQ process IDs, avoiding incorrect combination of different TBs, and improving efficiency of retransmission combining.

The method for determining a HARQ ID in the embodiments of the present invention is described below with reference to specific application scenarios.

Scenario 1

In this scenario, a HARQ ID is determined based on a time domain resource sequence number of a current transmission, a time domain resource offset, a time domain resource period, and a number of HARQ processes. The technical solution of this scenario avoids that one same TB corresponds to a plurality of HARQ IDs due to a plurality of retransmissions. In an example, the HARQ ID satisfies the following expression:

$$\text{HARQ Process ID} = [\text{floor}(t\_temp - \text{Toffset\_temp}/T\_temp)] \text{ modulo } B \quad (1)$$

where HARQ Process ID is a HARQ ID, t represents a time domain resource sequence number of a current transmission, Toffset represents a time domain resource offset, T represents a time domain resource period, and B represents a number of HARQ processes; floor represents rounding down, where certainly, in another manner, processing may be performed through a rounding up operation; and modulo represents modulo operation. t_temp, Toffset_temp, and T_temp are respectively parameters obtained by converting t, Toffset, and T based on a specific time unit. Absolute time units of t_temp, Toffset_temp, and T_temp are the same, and absolute time units of t, Toffset, and T may be the same or different.

Figure 3A:
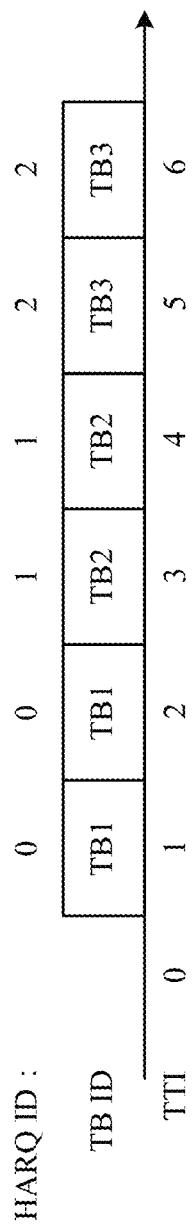
FIG. 3A and FIG. 3B are schematic diagrams of a first application of a method for determining a HARQ ID according to an embodiment of the present invention.
Figure 3B:
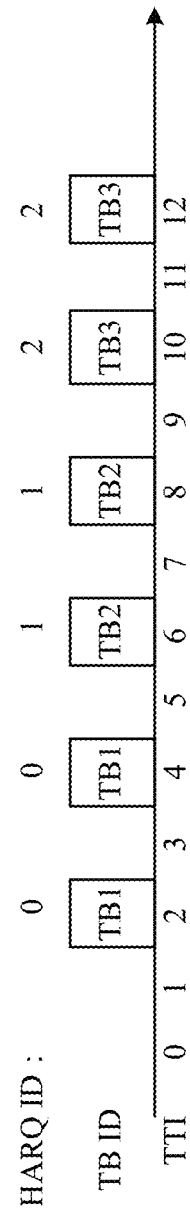

FIG. 3A and FIG. 3B are schematic diagrams of a first application of a method for determining a HARQ ID according to an embodiment of the present invention. As shown in FIG. 3A, in a scenario in which units of Toffset and T are the same as an absolute time length of a transmission. For example, T=2 ms (2 slots), Toffset=1 ms (1 slot), a quantity of processes is 3, and an absolute time length of one transmission is 1 ms (1 slot). In this case, Toffset_temp=Toffset, and T_temp=T. A HARQ ID obtained by calculation based on Expression (1) satisfies: HARQ Process ID=[floor(t−½)] modulo 3; so that when t=1 or 2, HARQ Process ID=0; when t=3 or 4, HARQ Process ID=1; and when t=5 or 6, HARQ Process ID=2.

In the foregoing scenario, a starting ID of a HARQ process is 0. If the starting ID of the HARQ process is not 0, an offset is added based on the foregoing Expression (1). For example, the starting ID of the HARQ process is 1, and a HARQ ID satisfies:

$$\text{HARQ Process ID} = [\text{floor}(t\_temp - \text{Toffset\_temp}/T\_temp)] \text{ modulo } B+1.$$

As shown in FIG. 3B, in a scenario in which units of Toffset and T are different from an absolute time length of a transmission. For example, T=2 ms (2 slots), Toffset=1 ms (1 slot), a quantity of processes is 3, and an absolute time length of one transmission is 0.5 ms (0.5 slot). In this case, Toffset_temp=1/0.5=2, and T_temp=2/0.5=4. A HARQ ID obtained by calculation based on Expression (1) satisfies:

$$\text{HARQ Process ID} = [\text{floor}(t-\tfrac{2}{4})] \text{ modulo } 3;$$

so that when t=2 or 4, HARQ Process ID=0; when t=6 or 8, HARQ Process ID=1; and when t=10 or 12, HARQ Process ID=2.

In the foregoing scenario, a starting ID of a HARQ process is 0. If the starting ID of the HARQ process is not 0, an offset is added based on the foregoing Expression (1). For example, the starting ID of the HARQ process is 1, and a HARQ ID satisfies:

$$\text{HARQ Process ID} = [\text{floor}(t\_temp - \text{Toffset\_temp}/T\_temp)] \text{ modulo } B+1.$$

In this embodiment of the present invention, T represents an interval between two transmissions that are not automatic retransmissions.

Scenario 2

In this scenario, a HARQ ID is determined based on a time domain resource sequence number of a current transmission, a time domain resource offset, a time domain resource period, a number of HARQ processes, and a HARQ ID offset. The technical solution of this scenario is used to resolve a problem of HARQ ID overlapping in a scenario configured with a plurality of grant free resources. In an example, the HARQ ID satisfies the following expression:

$$\text{HARQ Process ID} = [\text{floor}(t\_temp - \text{Toffset\_temp}/T\_temp)] \text{ modulo } B + \text{Hoffset} \quad (2)$$

where HARQ Process ID is a HARQ ID, t represents a time domain resource sequence number of a current transmission, Toffset represents a time domain resource offset, T represents a time domain resource period, and B represents a number of HARQ processes; Hoffset represents a HARQ ID offset; floor represents rounding down, where certainly, in another manner, processing may be performed through a rounding up operation; and modulo represents modulo operation. t_temp, Toffset_temp, and T_temp are respectively parameters obtained by converting t, Toffset, and T based on a specific time unit. Absolute time units of t_temp, Toffset_temp, and T_temp are the same, and absolute time units of t, Toffset, and T may be the same or different.

Figure 4A:
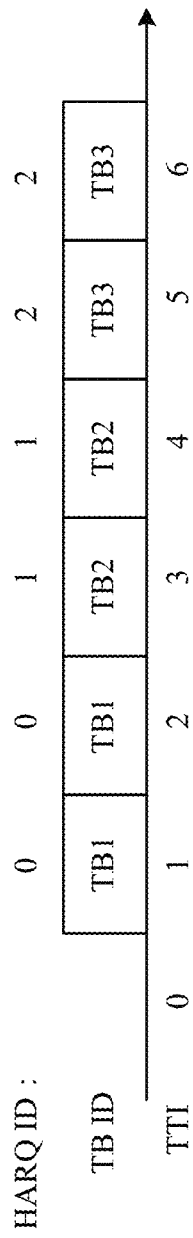
FIG. 4A and FIG. 4B are schematic diagrams of a second application of a method for determining a HARQ ID according to an embodiment of the present invention.
Figure 4B:
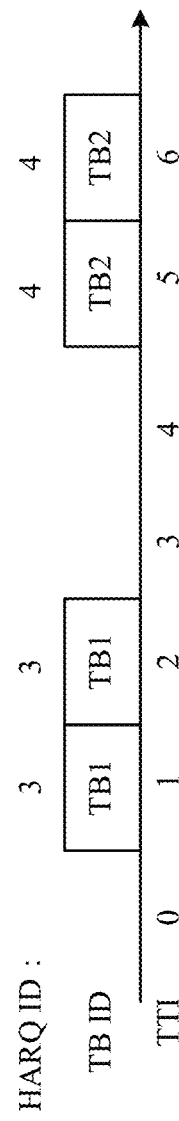

FIG. 4A and FIG. 4B are schematic diagrams of a second application of a method for determining a HARQ ID according to an embodiment of the present invention. As shown in FIG. 4A and FIG. 4B, in a scenario in which units of Toffset and T are the same as an absolute time length of a transmission, two grant free resources are configured. Grant Free Resource 1: T1=2 ms (2 slots), Toffset1=1 ms (1 slot), a quantity of processes is 3, and Hoffset=0. Grant Free Resource 2: T2=4 ms (4 slots), Toffset2=1 ms (1 slot), a quantity of processes is 2, and Hoffset=3. An absolute time length of one transmission is 1 ms (1 slot), and HARQ IDs respectively obtained by performing calculation on Grant Free Resource 1 and Grant Free Resource 2 based on Expression (2) satisfy:

HARQ Process ID for Grant free 1=[floor(t−½)] modulo 3; and

HARQ Process ID for Grant free 2=[floor(t−¼)] modulo 2+3.

For Grant Free Resource 1, as shown in FIG. 4A, when t=1 or 2, HARQ Process ID=0; when t=3 or 4, HARQ Process ID=1; and when t=5 or 6, HARQ Process ID=2.

For Grant Free Resource 2, as shown in FIG. 4B, when t=1 or 2, HARQ Process ID=3; and when t=5 or 6, HARQ Process ID=4.

In the foregoing scenario, a starting ID of a HARQ process is 0. If the starting ID of the HARQ process is not 0, an offset is added based on the foregoing Expression (2). For example, the starting ID of the HARQ process is 1, and a HARQ ID satisfies:

$$\text{HARQ Process ID} = [\text{floor}(t\_temp - \text{Toffset\_temp}/T\_temp)] \text{ modulo } B + \text{Hoffset} + 1.$$

The foregoing example is a scenario in which units of Toffset and T are the same as an absolute time length of a transmission. For a scenario in which units of Toffset and T are different from an absolute time length of a transmission, refer to descriptions on conversion of Toffset and T shown in FIG. 3B. Examples are not described again in this scenario.

In this embodiment of the present invention, T represents an interval between two transmissions that are not automatic retransmissions.

Scenario 3

In this scenario, a HARQ ID is determined based on a time domain resource sequence number of a current transmission, a time domain resource period, a number of HARQ processes, and a HARQ ID offset. In an example, the HARQ ID satisfies the following expression:

$$\text{HARQ Process ID} = [\text{floor}(t\_temp / T\_temp)] \text{ modulo } B + \text{Hoffset} \quad (3)$$

where HARQ Process ID is a HARQ ID, t represents a time domain resource sequence number of a current transmission, T represents a time domain resource period, and B represents a number of HARQ processes; Hoffset represents a HARQ ID offset; floor represents rounding down, where certainly, in another manner, processing may be performed through a rounding up operation; and modulo represents modulo operation. t_temp and T_temp are respectively parameters obtained by converting t and T based on a specific time unit. Absolute time units of t_temp and T_temp are the same, and absolute time units oft and T may be the same or different. Usually, in this scenario, a starting position is limited. For example, a starting position of a grant free resource needs to be an integer multiple of a period, or a starting position modulo period is less than a period; or a modulo period of a sum of a starting position and a quantity of repetitions is less than a period.

Figure 5A:
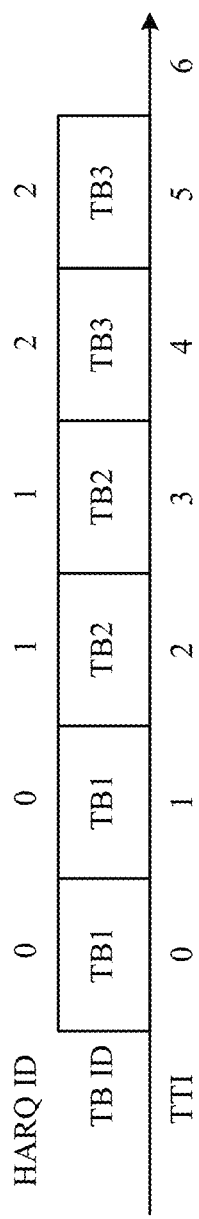
FIG. 5A and FIG. 5B are schematic diagrams of a third application of a method for determining a HARQ ID according to an embodiment of the present invention.
Figure 5B:
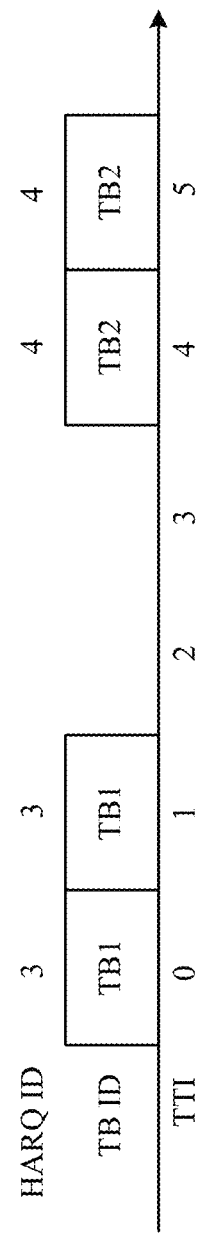

FIG. 5A and FIG. 5B are schematic diagrams of a third application of a method for determining a HARQ ID according to an embodiment of the present invention. As shown in FIG. 5A and FIG. 5B, in a scenario in which units of Toffset and T are the same as an absolute time length of a transmission, two grant free resources are configured. Grant Free Resource 1: T1=2 ms (2 slots), a quantity of processes is 3, and Hoffset=0. Grant Free Resource 2: T2=4 ms (4 slots), a quantity of processes is 2, and Hoffset=3. An absolute time length of one transmission is 1 ms (1 slot), and HARQ IDs respectively obtained by performing calculation on Grant Free Resource 1 and Grant Free Resource 2 based on Expression (3) satisfy:

HARQ Process ID for grant free1=[floor(*t*/2)]
modulo 3; and

HARQ Process ID for grant free2=[floor(*t*/4)]
modulo 2+3.

For Grant Free Resource 1, as shown in FIG. 5A, when t=1 or 2, HARQ Process ID=0; when t=3 or 4, HARQ Process ID=1; and when t=5 or 6, HARQ Process ID=2.

For Grant Free Resource 2, as shown in FIG. 5B, when t=1 or 2, HARQ Process ID=3; and when t=5 or 6, HARQ Process ID=4.

In the foregoing scenario, a starting ID of a HARQ process is 0. If the starting ID of the HARQ process is not 0, an offset is added based on the foregoing Expression (3). For example, the starting ID of the HARQ process is 1, and a HARQ ID satisfies:

HARQ Process ID=[floor(*t*_temp/*T*_temp)] modulo
*B*+Hoffset+1.

The foregoing example is a scenario in which units of Toffset and T are the same as an absolute time length of a transmission. For a scenario in which units of Toffset and T are different from an absolute time length of a transmission, refer to descriptions on conversion of Toffset and T shown in FIG. 3B. Examples are not described again in this scenario.

Scenario 4

In this scenario, a HARQ ID is determined based on a time domain resource sequence number of a current transmission, a time domain resource offset, a quantity of transmission times of a current transport TB, a time domain resource period, a number of HARQ processes, and a HARQ ID offset. The technical solution of this scenario avoids that one same TB corresponds to a plurality of HARQ IDs due to a plurality of retransmissions, particularly, in a scenario in which a quantity of retransmissions is greater than a time domain period T of a grant free resource. In an example, the HARQ ID satisfies the following expression:

HARQ Process ID=[floor(*t*_temp−Toffset_temp−
current *n*/*T*)] modulo *B*+Hoffset    (4)

where HARQ Process ID is a HARQ ID, t represents a time domain resource sequence number of a current transmission, Toffset represents a time domain resource offset, current_n represents a quantity of transmission times of a current transport TB, T represents a time domain resource period, and B represents a number of HARQ processes; Hoffset represents a HARQ ID offset;

floor represents rounding down, where certainly, in another manner, processing may be performed through a rounding up operation; and modulo represents modulo operation. t_temp, Toffset_temp, and T_temp are respectively parameters obtained by converting t, Toffset, and T based on a specific time unit. Absolute time units of t_temp, Toffset_temp, and T_temp are the same, and absolute time units of t, Toffset, and T may be the same or different. If a quantity of transmission times is numbered from 0, it is directly represented by current_n in the formula. If a quantity of transmission times is numbered from 1, it is directly represented by current_n−1 in the formula. T (including T1 and T2) is a time domain interval of a grant free resource.

Refer to FIG. 4A and FIG. 4B for specific schematic diagrams of applications of this scenario. In a scenario in which units of Toffset and T are the same as an absolute time length of a transmission, two grant free resources are configured. Grant Free Resource 1: T1=1 ms (2 slots), Toffset1=1 ms (1 slot), a quantity of processes is 3, and Hoffset=0. Grant Free Resource 2: T2=4 ms (4 slots), Toffset2=1 ms (1 slot), a quantity of processes is 2, and Hoffset=3. An absolute time length of one transmission is 1 ms (1 slot), and HARQ IDs respectively obtained by performing calculation on Grant Free Resource 1 and Grant Free Resource 2 based on Expression (4) satisfy:

HARQ Process ID for Grant free 1=[floor(*t*−1−current_*n*/2)] modulo 3; and

HARQ Process ID for Grant free 2=[floor(*t*−1−current_*n*/4)] modulo 2+3.

For Grant Free Resource 1, as shown in FIG. 4A, when t=1 or 2, current_n=0 or 1, and HARQ Process ID=0; when t=3 or 4, current_n=0 or 1, and HARQ Process ID=1; and when t=5 or 6, HARQ Process ID=2.

For Grant Free Resource 2, as shown in FIG. 4B, when t=1 or 2, current_n=0 or 1, and HARQ Process ID=3; and when t=5 or 6, current_n=0 or 1, and HARQ Process ID=4.

In the foregoing scenario, a starting ID of a HARQ process is 0. If the starting ID of the HARQ process is not 0, an offset is added based on the foregoing Expression (4). For example, the starting ID of the HARQ process is 1, and a HARQ ID satisfies:

HARQ Process ID=[floor(*t*_temp−Toffset_temp−
current_*n*/*T*)] modulo *B*+Hoffset+1.

In another example, FIG. 6A and FIG. 6B are schematic diagrams of a fourth application of a method for determining a HARQ ID according to an embodiment of the present invention. As shown in FIG. 6A and FIG. 6B, in a scenario in which units of Toffset and T are the same as an absolute time length of a transmission, two grant free resources are configured. Grant Free Resource 1: T1=1 ms (2 slots), Toffset1=1 ms (1 slot), a quantity of processes is 3, and Hoffset=0. Grant Free Resource 2: T2=4 ms (4 slots), Toffset2=1 ms (1 slot), a quantity of processes is 2, and Hoffset=3. An absolute time length of one transmission is 1 ms (1 slot), and HARQ IDs respectively obtained by performing calculation on Grant Free Resource 1 and Grant Free Resource 2 based on Expression (4) satisfy:

HARQ Process ID for Grant free 1=[floor(*t*−0−current_*n*/2)] modulo 3; and

HARQ Process ID for Grant free 2=[floor(*t*−1−current_*n*/4)] modulo 2+3.

For Grant Free Resource 1, as shown in FIG. 6A, when t=1 or 2, current_n=0 or 1, and HARQ Process ID=0; when t=3 or 4, current_n=0 or 1, and HARQ Process ID=1; and when t=5 or 6, HARQ Process ID=2.

For Grant Free Resource 2, as shown in FIG. 6B, when t=1 or 2, current_n=0 or 1, and HARQ Process ID=3; and when t=5 or 6, current_n=0 or 1, and HARQ Process ID=4.

The foregoing example is a scenario in which units of Toffset and T are the same as an absolute time length of a transmission. For a scenario in which units of Toffset and T are different from an absolute time length of a transmission, refer to descriptions on conversion of Toffset and T shown in FIG. 3B. Examples are not described again in this scenario.

Scenario 5

In this scenario, a HARQ ID is determined based on a time domain resource sequence number of a current transmission, a time domain resource offset, a quantity of transmission times of a current transport TB, a time domain resource period, and a number of HARQ processes. In an example, the HARQ ID satisfies the following expression:

$$\text{HARQ Process ID}=[\text{floor}(t\_temp-\text{Toffset}\_temp-\text{current}\_n/T)] \text{ modulo } B$$

where HARQ Process ID is a HARQ ID, t represents a time domain resource sequence number of a current transmission, Toffset represents a time domain resource offset, current_n represents a quantity of transmission times of a current transport TB, T represents a time domain resource period, and B represents a number of HARQ processes; floor represents rounding down, where certainly, in another manner, processing may be performed through a rounding up operation; and modulo represents modulo operation. t_temp, Toffset_temp, and T_temp are respectively parameters obtained by converting t, Toffset, and T based on a specific time unit. Absolute time units of t_temp, Toffset_temp, and T_temp are the same, and absolute time units of t, Toffset, and T may be the same or different. If a quantity of transmission times is numbered from 0, it is directly represented by current_n in the formula. If a quantity of transmission times is numbered from 1, it is directly represented by current_n−1 in the formula. T (including T1 and T2) is a time domain interval of a grant free resource.

Scenario 6

In this scenario, a HARQ ID is determined based on a time domain resource sequence number of a current transmission, a quantity of transmission times of a current transport TB, a time domain resource period, a number of HARQ processes, and a HARQ ID offset. In an example, the HARQ ID satisfies the following expression:

$$\text{HARQ Process ID}=[\text{floor}(t\_temp-\text{current}\_n/T)] \text{ modulo } B+\text{Hoffset}$$

where HARQ Process ID is a HARQ ID, t represents a time domain resource sequence number of a current transmission, current_n represents a quantity of transmission times of a current transport TB, T represents a time domain resource period, and B represents a number of HARQ processes; Hoffset represents a HARQ ID offset; floor represents rounding down, where certainly, in another manner, processing may be performed through a rounding up operation; and modulo represents modulo operation. t_temp and T_temp are respectively parameters obtained by converting t and T based on a specific time unit. Absolute time units of t_temp and T_temp are the same, and absolute time units of t and T may be the same or different. If a quantity of transmission times is numbered from 0, it is directly represented by current_n in the formula. If a quantity of transmission times is numbered from 1, it is directly represented by current_n−1 in the formula. T (including T1 and T2) is a time domain interval of a grant free resource.

Scenario 7

In this scenario, a HARQ ID is determined based on a time domain resource sequence number of a current transmission, a quantity of transmission times of a current transport TB, a time domain resource period, and a number of HARQ processes. In an example, the HARQ ID satisfies the following expression:

$$\text{HARQ Process ID}=[\text{floor}((t\_temp-\text{current}\_n)/T)] \text{ modulo } B$$

where HARQ Process ID is a HARQ ID, t represents a time domain resource sequence number of a current transmission, current_n represents a quantity of transmission times of a current transport TB, T represents a time domain resource period, and B represents a number of HARQ processes; floor represents rounding down, where certainly, in another manner, processing may be performed through a rounding up operation; and modulo represents modulo operation. t_temp and T_temp are respectively parameters obtained by converting t and T based on a specific time unit. Absolute time units of t_temp and T_temp are the same, and absolute time units of t and T may be the same or different. If a quantity of transmission times is numbered from 0, it is directly represented by current_n in the formula. If a quantity of transmission times is numbered from 1, it is directly represented by current_n−1 in the formula. T (including T1 and T2) is a time domain interval of a grant free resource.

Scenario 8

Based on the foregoing Scenario 4 to Scenario 7, in a process of determining a HARQ ID, with reference to the quantity of transmission times of the current transport TB, a transmission pattern may further be included. It may be understood that in a first implementation, the determining, by the network device, the HARQ ID based on the time domain resource sequence number of the current transmission, the quantity of transmission times of the current transport TB, the time domain resource period, the number of HARQ processes, and the HARQ ID offset includes: determining, by the network device, the HARQ ID based on the time domain resource sequence number of the current transmission, the quantity of transmission times of the current transport TB, a transmission pattern of the current transmission, the time domain resource period, the number of HARQ processes, and the HARQ ID offset.

In a second implementation, the determining, by the network device, the HARQ ID based on the time domain resource sequence number of the current transmission, the quantity of transmission times of the current transport TB, the time domain resource period, and the number of HARQ processes includes: determining, by the network device, the HARQ ID based on the time domain resource sequence number of the current transmission, the quantity of transmission times of the current transport TB, a transmission pattern of the current transmission, the time domain resource period, and the number of HARQ processes.

In a third implementation, the determining, by the network device, the HARQ ID based on the time domain resource sequence number of the current transmission, the time domain resource offset, the quantity of transmission times of the current transport TB, the time domain resource period, and the number of HARQ processes includes: determining, by the network device, the HARQ ID based on the time domain resource sequence number of the current transmission, the time domain resource offset, the quantity of transmission times of the current transport TB, a transmission pattern of the current transmission, the time domain resource period, and the number of HARQ processes.

In a fourth implementation, the determining, by the network device, the HARQ ID based on the time domain resource sequence number of the current transmission, the time domain resource offset, the quantity of transmission times of the current transport TB, the time domain resource period, the number of HARQ processes, and the HARQ ID offset includes: determining, by the network device, the HARQ ID based on the time domain resource sequence number of the current transmission, the time domain resource offset, the quantity of transmission times of the current transport TB, a transmission pattern of the current transmission, the time domain resource period, the number of HARQ processes, and the HARQ ID offset.

Figure 7:
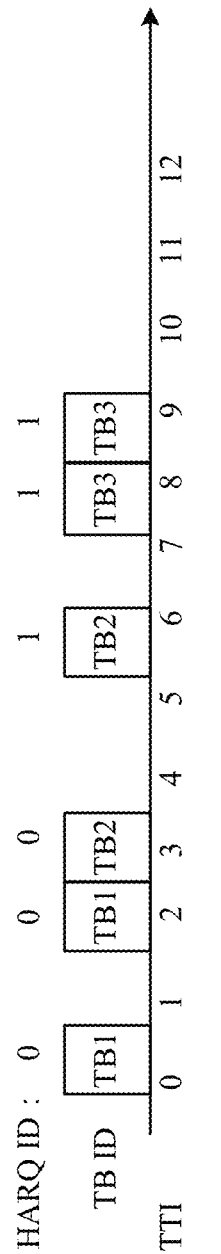
FIG. 7 is a schematic diagram of a fifth application of a method for determining a HARQ ID according to an embodiment of the present invention.

Specifically, as a specific description of the first implementation, in an example, the HARQ ID satisfies the following expression:

$$\text{HARQ Process ID}=[\text{floor}(t\_temp-\text{Pattern}(\text{current}\_n)+\text{Pattern}(0))/T)] \text{ modulo } B+\text{Hoffset}$$

where HARQ Process ID is a HARQ ID, t represents a time domain resource sequence number of a current transmission, current_n represents a quantity of transmission times of a current transport TB, Pattern is a transmission pattern of a plurality of transmission, T represents a time domain resource period, B represents to number of HARQ processes, and Hoffset represents a HARQ ID offset; floor represents rounding down, where certainly, in another manner, processing may be performed through a rounding up operation; and modulo represents modulo operation. t_temp and T_temp are respectively parameters obtained by converting t and T based on a specific time unit. Absolute time units of t_temp and T_temp are the same, and absolute time units of t and T may be the same or different. If a quantity of transmission times is numbered from 0, it is directly represented by current_n in the formula. If a quantity of transmission times is numbered from 1, it is directly represented by current_n−1 in the formula. T (including T1 and T2) is a time domain interval of a grant free resource. As shown in FIG. 7, Pattern(0)=0, Pattern(1)=2, and Pattern(2)=3; and T=6, B=2, and Hoffset=0.

In a second example, the HARQ ID satisfies the following expression:

$$\text{HARQ Process ID} = [\text{floor}((t\_temp - \text{Pattern}(current\_n) + \text{Pattern}(0))/T)] \text{ modulo } B$$

where HARQ Process ID is a HARQ ID, t represents a time domain resource sequence number of a current transmission, current_n represents a quantity of transmission times of a current transport TB, Pattern is a transmission pattern of a plurality of transmission, T represents a time domain resource period, and B represents a number of HARQ processes; floor represents rounding down, where certainly, in another manner, processing may be performed through a rounding up operation; and modulo represents modulo operation. t_temp and T_temp are respectively parameters obtained by converting t and T based on a specific time unit. Absolute time units of t_temp and T_temp are the same, and absolute time units of t and T may be the same or different. If a quantity of transmission times is numbered from 0, it is directly represented by current_n in the formula. If a quantity of transmission times is numbered from 1, it is directly represented by current_n−1 in the formula. T (including T1 and T2) is a time domain interval of a grant free resource.

In a third example, the HARQ ID satisfies the following expression:

$$\text{HARQ Process ID} = [\text{floor}(t\_temp - \text{Toffset\_temp} - \text{Pattern}(current\_n) + \text{Pattern}(0))/T)] \text{ modulo } B$$

where HARQ Process ID is a HARQ ID, t represents a time domain resource sequence number of a current transmission, Toffset represents a time domain resource offset, current_n represents a quantity of transmission times of a current transport TB, Pattern is a transmission pattern of a plurality of transmission, T represents a time domain resource period, and B represents a number of HARQ processes; floor represents rounding down, where certainly, in another manner, processing may be performed through a rounding up operation; and modulo represents modulo operation. t_temp, Toffset_temp, and T_temp are respectively parameters obtained by converting t, Toffset, and T based on a specific time unit. Absolute time units of t_temp, Toffset_temp, and T_temp are the same, and absolute time units of t, Toffset, and T may be the same or different. If a quantity of transmission times is numbered from 0, it is directly represented by current_n in the formula. If a quantity of transmission times is numbered from 1, it is directly represented by current_n−1 in the formula. T (including T1 and T2) is a time domain interval of a grant free resource.

In a fourth example, the HARQ ID satisfies the following expression:

$$\text{HARQ Process ID} = [\text{floor}(t\_temp - \text{Toffset\_temp} - \text{Pattern}(current\_n) + \text{Pattern}(0))/T)] \text{ modulo } B + \text{Hoffset}$$

where HARQ Process ID is a HARQ ID, t represents a time domain resource sequence number of a current transmission, Toffset represents a time domain resource offset, current_n represents a quantity of transmission times of a current transport TB, Pattern is a transmission pattern of a plurality of transmission, T represents a time domain resource period, B represents a number of HARQ processes, and Hoffset represents a HARQ ID offset; floor represents rounding down, where certainly, in another manner, processing may be performed through a rounding up operation; and modulo represents modulo operation. t_temp, Toffset_temp, and T_temp are respectively parameters obtained by converting t, Toffset, and T based on a specific time unit. Absolute time units of t_temp, Toffset_temp, and T_temp are the same, and absolute time units of t, Toffset, and T may be the same or different. If a quantity of transmission times is numbered from 0, it is directly represented by current_n in the formula. If a quantity of transmission times is numbered from 1, it is directly represented by current_n−1 in the formula. T (including T1 and T2) is a time domain interval of a grant free resource.

Embodiment 3

Figure 8:
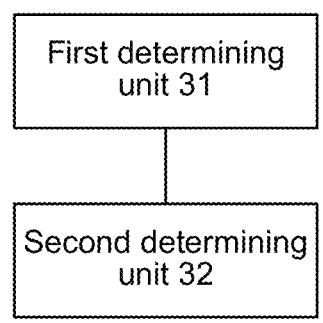
FIG. 8 is a schematic structural diagram of a network device according to an embodiment of the present invention.

This embodiment of the present invention further provides a network device. FIG. 8 is a schematic structural diagram of a network device according to an embodiment of the present invention. As shown in 8, the network device includes a first determining unit 31 and a second determining unit 32.

The first determining unit 31 is configured to: determine a time domain resource sequence number of a current transmission and a number of HARQ processes, and determine at least one type of information of time domain resource configuration information, a HARQ ID offset or a quantity of transmission times of a current transport TB, where the time domain resource configuration information includes a time domain resource offset and/or a time domain resource period of non-dynamic resource configuration.

The second determining unit 32 is configured to determine a HARQ ID based on the time domain resource sequence number of the current transmission, the number of HARQ processes, and the at least one type of information of the time domain resource configuration information, the HARQ ID offset or the quantity of transmission times of the current transport TB that are determined by the first determining unit 31.

In a first implementation, the second determining unit 32 is configured to determine the HARQ ID based on the time domain resource sequence number of the current transmission, the time domain resource offset, the time domain resource period, and the number of HARQ processes.

In a second implementation, the second determining unit 32 is configured to determine the HARQ ID based on the time domain resource sequence number of the current transmission, the time domain resource offset, the time domain resource period, the number of HARQ processes, and the HARQ ID offset.

In a third implementation, the second determining unit 32 is configured to determine the HARQ ID based on the time domain resource sequence number of the current transmission, the time domain resource period, the number of HARQ processes, and the HARQ ID offset.

In a fourth implementation, the second determining unit 32 is configured to determine the HARQ ID based on the time domain resource sequence number of the current transmission, the time domain resource offset, the quantity of transmission times of the current transport TB, the time domain resource period, the number of HARQ processes, and the HARQ ID offset.

In a fifth implementation, the second determining unit 32 is configured to determine the HARQ ID based on the time domain resource sequence number of the current transmission, the quantity of transmission times of the current transport TB, the time domain resource period, the number of HARQ processes, and the HARQ ID offset.

In a sixth implementation, the second determining unit 32 is configured to determine the HARQ ID based on the time domain resource sequence number of the current transmission, the quantity of transmission times of the current transport TB, the time domain resource period, and the number of HARQ processes.

In a seventh implementation, the second determining unit 32 is configured to determine the HARQ ID based on the time domain resource sequence number of the current transmission, the time domain resource offset, the quantity of transmission times of the current transport TB, the time domain resource period, and the number of HARQ processes.

In this embodiment of the present invention, the unit of the time domain resource offset is the same as or different from an absolute time length of a transmission.

In this embodiment of the present invention, the unit of the time domain resource period is the same as or different from an absolute time length of a transmission.

Figure 9:
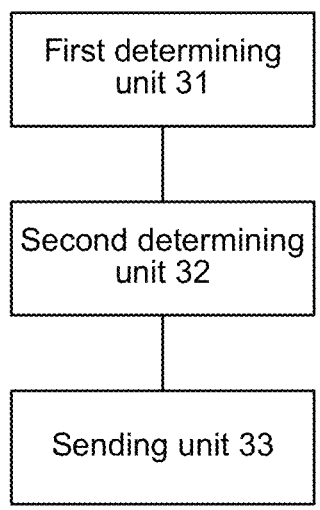
FIG. 9 is another schematic structural diagram of a network device according to an embodiment of the present invention.

In an implementation, as shown in FIG. 9, the network device further includes a sending unit 33, configured to send signaling to a terminal, where the signaling carries at least one type of information of the number of HARQ processes, the time domain resource configuration information, and the HARQ ID offset; and the signaling includes one piece of RRC signaling, higher layer signaling or physical layer signaling.

In this embodiment of the present invention, during actual application, the first determining unit 31 and the second determining unit 32 in the network device may both be implemented by a central processing unit (CPU, Central Processing Unit), a digital signal processor (DSP, Digital Signal Processor), a microcontroller unit (MCU, Microcontroller Unit) or a field-programmable gate array (FPGA, Field-Programmable Gate Array). During actual application, the sending unit 33 in the network device may be implemented by using a communications module (including a basic communications suite, an operating system, a communications module, a standardized interface, a protocol, and the like) and a transmit/receive antenna.

It should be noted that, in a case that the network device provided in the foregoing embodiment determines a HARQ ID, the foregoing division of the program modules is merely an example for description. During actual application, the foregoing processing may be allocated to and completed by different program modules as required. That is, an internal structure of the network device is divided into different program modules, to complete all or some of the processing described above. In addition, the network device provided in the foregoing embodiments and the method embodiments belong to a same concept. For a specific implementation process, refer to the method embodiments, and details are not described herein again.

Embodiment 4

Figure 10:
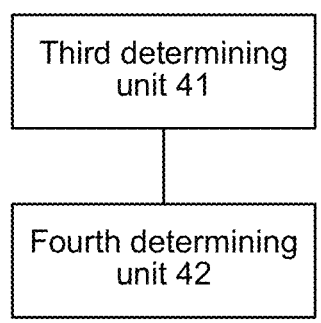
FIG. 10 is a schematic structural diagram of a terminal according to an embodiment of the present invention.

This embodiment of the present invention further provides a terminal. FIG. 10 is a schematic structural diagram of a terminal according to an embodiment of the present invention. As shown in FIG. 10, the terminal includes a third determining unit 41 and a fourth determining unit 42.

The third determining unit 41 is configured to: determine a time domain resource sequence number of a current transmission and a number of HARQ processes, and determine at least one type of information of time domain resource configuration information, a HARQ ID offset or a quantity of transmission times of a current transport TB, where the time domain resource configuration information includes a time domain resource offset and/or a time domain resource period.

The fourth determining unit 42 is configured to determine a HARQ ID based on the time domain resource sequence number of the current transmission, the number of HARQ processes, and the at least one type of information of the time domain resource configuration information, the HARQ ID offset or the quantity of transmission times of the current transport TB that are determined by the third determining unit 41.

Figure 11:
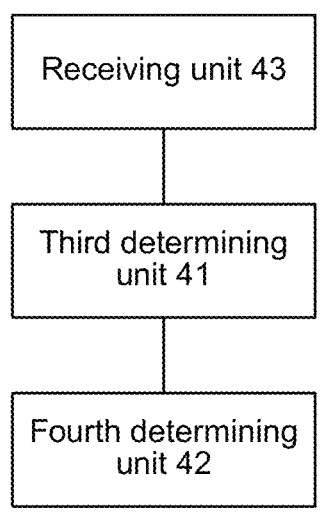
FIG. 11 is another schematic structural diagram of a terminal according to an embodiment of the present invention.

In an embodiment, as shown in FIG. 11, the terminal further includes a receiving unit 43, configured to receive signaling from a network device, and the signaling includes one piece of RRC signaling, higher layer signaling or physical layer signaling.

The third determining unit 41 is configured to determine, based on the signaling received by the receiving unit 43, at least one type of the following information: the number of HARQ processes, the time domain resource configuration information, and the HARQ ID offset.

In a first implementation, the fourth determining unit 42 is configured to determine the HARQ ID based on the time domain resource sequence number of the current transmission, the time domain resource offset, the time domain resource period, and the number of HARQ processes.

In a second implementation, the fourth determining unit 42 is configured to determine the HARQ ID based on the time domain resource sequence number of the current transmission, the time domain resource offset, the time domain resource period, the number of HARQ processes, and the HARQ ID offset.

In a third implementation, the fourth determining unit 42 is configured to determine the HARQ ID based on the time domain resource sequence number of the current transmission, the time domain resource period, the number of HARQ processes, and the HARQ ID offset.

In a fourth implementation, the fourth determining unit 42 is configured to determine the HARQ ID based on the time domain resource sequence number of the current transmission, the time domain resource offset, the quantity of transmission times of the current transport TB, the time domain resource period, the number of HARQ processes, and the HARQ ID offset.

In a fifth implementation, the fourth determining unit 42 is configured to determine the HARQ ID based on the time domain resource sequence number of the current transmission, the quantity of transmission times of the current transport TB, the time domain resource period, the number of HARQ processes, and the HARQ ID offset.

In a sixth implementation, the fourth determining unit 42 is configured to determine the HARQ ID based on the time domain resource sequence number of the current transmission, the quantity of transmission times of the current transport TB, the time domain resource period, and the number of HARQ processes.

In a seventh implementation, the fourth determining unit 42 is configured to determine the HARQ ID based on the time domain resource sequence number of the current transmission, the time domain resource offset, the quantity of transmission times of the current transport TB, the time domain resource period, and the number of HARQ processes.

In this embodiment of the present invention, the unit of the time domain resource offset is the same as or different from an absolute time length of a transmission.

In this embodiment of the present invention, the unit of the time domain resource period is the same as or different from an absolute time length of a transmission.

In this embodiment of the present invention, during actual application, the third determining unit 41 and the fourth determining unit 42 in the terminal may both be implemented by a CPU, a DSP, an MCU or an FPGA. During actual application, the receiving unit 43 in the terminal may be implemented by using a communications module (including a basic communications suite, an operating system, a communications module, a standardized interface, a protocol, and the like) and a transmit/receive antenna.

It should be noted that, in a case that the terminal provided in the foregoing embodiment determines a HARQ ID, the foregoing division of the program modules is merely an example for description. During actual application, the foregoing processing may be allocated to and completed by different program modules as required. That is, an internal structure of the terminal is divided into different program modules, to complete all or some of the processing described above. In addition, the terminal provided in the foregoing embodiments and the method embodiments belong to a same concept. For a specific implementation process, refer to the method embodiments, and details are not described herein again.

Embodiment 5

Figure 12:
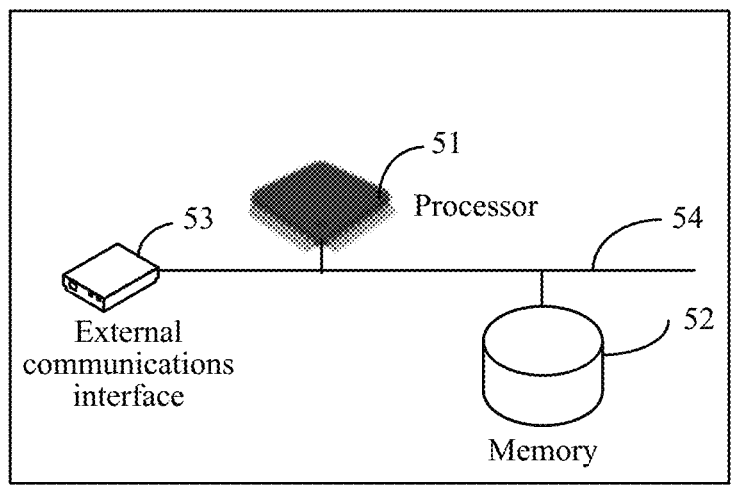
FIG. 12 is a schematic structural diagram of hardware of a network device/terminal according to an embodiment of the present invention.

This embodiment of the present invention further provides a terminal. FIG. 12 is a schematic structural diagram of hardware of a network device/terminal according to an embodiment of the present invention. As shown in FIG. 12, the network device/terminal includes: at least one processor 51 and a memory 52 configured to store a computer program that can be run on the processor 51. The network device/terminal further includes a communications component configured to transmit data. Components are coupled together by a bus system 54. It may be understood that, the bus system 54 is configured to implement connection and communication between the components. In addition to a data bus, the bus system 54 further includes a power supply bus, a control bus, and a status signal bus. However, for the purpose of clear description, various types of buses are marked as the bus system 54 in FIG. 12.

It may be understood that, the memory 52 may be a volatile memory or a non-volatile memory, or may include both a volatile memory and a non-volatile memory. The non-volatile memory may be a read-only memory (ROM, Read Only Memory), a programmable ROM (PROM, Programmable Read-Only Memory), an erasable PROM (EPROM, Erasable Programmable Read-Only Memory), an electrically EPROM (EEPROM, Electrically Erasable Programmable Read-Only Memory), a ferromagnetic random access memory (FRAM, Ferromagnetic Random Access Memory), a flash memory, a magnetic surface memory, an optical disc or a compact disc ROM (CD-ROM, Compact Disc Read-Only Memory). The magnetic surface memory may be a magnetic disk memory or a magnetic tape memory. The volatile memory may be a random access memory (RAM, Random Access Memory), used as an external cache. Through exemplary but non-limitative descriptions, RAMs in a plurality of forms may be used, for example, a static RAM (SRAM, Static Random Access Memory), a synchronous SRAM (SSRAM, Synchronous Static Random Access Memory), a dynamic RAM (DRAM, Dynamic Random Access Memory), a synchronous DRAM (SDRAM, Synchronous Dynamic Random Access Memory), a double data rate SDRAM (DDR SDRAM, Double Data Rate Synchronous Dynamic Random Access Memory), an enhanced SDRAM (ESDRAM, Enhanced Synchronous Dynamic Random Access Memory), a SyncLink DRAM (SLDRAM, SyncLink Dynamic Random Access Memory), and a direct rambus RAM (DRRAM, Direct Rambus Random Access Memory). The memory 52 described in the embodiments of the present invention is intended to include, but is not limited to, these memories and any other memory of an appropriate type.

The methods disclosed in the foregoing embodiment of the present invention may be applied in the processor 51, or may be implemented by the processor 51. The processor 51 may be an integrated circuit chip, having a capability of processing a signal. During implementation, each step of the foregoing methods may be implemented by an integrated logic circuit in a hardware form in the processor 51 or by an instruction in a software form. The processor 51 may be a general-purpose processor, a DSP, or another programmable logic device, discrete gate or transistor logic device, discrete hardware component or the like. The processor 51 can implement or perform the methods, steps, and logic block diagrams disclosed in the embodiments of the present invention. The general-purpose processor may be a microprocessor, any conventional processor or the like. The steps in the methods disclosed in the embodiments of the present invention may be directly implemented by a hardware decoding processor, or may be implemented by combining hardware and software modules in a decoding processor. The software module may be located in the storage medium. The storage medium is located in the memory 52. The processor 51 reads information in the memory 52, and completes the steps of the foregoing methods in combination with hardware thereof.

In a first implementation, as a network device, when executing the program, the processor 51 implements: determining a time domain resource sequence number of a current transmission and a number of HARQ processes, and determining at least one type of information of time domain resource configuration information, a HARQ ID offset or a quantity of transmission times of a current transport TB, where the time domain resource configuration information includes a time domain resource offset and/or a time domain resource period of non-dynamic resource configuration; and determining a HARQ ID based on the time domain resource sequence number of the current transmission, the number of HARQ processes, and the at least one type of information of the time domain resource configuration information, the HARQ ID offset or the quantity of transmission times of the current transport TB.

In an embodiment, when executing the program, the processor 51 implements: determining the HARQ ID based on the time domain resource sequence number of the current transmission, the time domain resource offset, the time domain resource period, and the number of HARQ processes.

In an embodiment, when executing the program, the processor 51 implements: determining the HARQ ID based on the time domain resource sequence number of the current transmission, the time domain resource offset, the time domain resource period, the number of HARQ processes, and the HARQ ID offset.

In an embodiment, when executing the program, the processor 51 implements: determining the HARQ ID based on the time domain resource sequence number of the current transmission, the time domain resource period, the number of HARQ processes, and the HARQ ID offset.

In an embodiment, when executing the program, the processor 51 implements: determining the HARQ ID based on the time domain resource sequence number of the current transmission, the time domain resource offset, the quantity of transmission times of the current transport TB, the time domain resource period, the number of HARQ processes, and the HARQ ID offset.

In an embodiment, when executing the program, the processor 51 implements: determining the HARQ ID based on the time domain resource sequence number of the current transmission, the quantity of transmission times of the current transport TB, the time domain resource period, the number of HARQ processes, and the HARQ ID offset.

In an embodiment, when executing the program, the processor 51 implements: determining the HARQ ID based on the time domain resource sequence number of the current transmission, the quantity of transmission times of the current transport TB, the time domain resource period, and the number of HARQ processes.

In an embodiment, when executing the program, the processor 51 implements: determining the HARQ ID based on the time domain resource sequence number of the current transmission, the time domain resource offset, the quantity of transmission times of the current transport TB, the time domain resource period, and the number of HARQ processes.

In an embodiment, when executing the program, the processor 51 implements: sending signaling to a terminal, where the signaling carries at least one type of information of the number of HARQ processes, the time domain resource configuration information, and the HARQ ID offset; and the signaling includes one piece of RRC signaling, higher layer signaling or physical layer signaling.

In another implementation, as a terminal, when executing the program, the processor 51 implements: determining a time domain resource sequence number of a current transmission and a number of HARQ processes, and determining at least one type of information of time domain resource configuration information, a HARQ ID offset or a quantity of transmission times of a current transport TB, where the time domain resource configuration information includes a time domain resource offset and/or a time domain resource period; and determining a HARQ ID based on the time domain resource sequence number of the current transmission, the number of HARQ processes, and the at least one type of information of the time domain resource configuration information, the HARQ ID offset or the quantity of transmission times of the current transport TB.

In an embodiment, when executing the program, the processor 51 implements: receiving signaling from a network device, and determining, based on the signaling, at least one type of the following information: the number of HARQ processes, the time domain resource configuration information, and the HARQ ID offset, where the signaling includes one piece of RRC signaling, higher layer signaling or physical layer signaling.

In an embodiment, when executing the program, the processor 51 implements: determining the HARQ ID based on the time domain resource sequence number of the current transmission, the time domain resource offset, the time domain resource period, and the number of HARQ processes.

In an embodiment, when executing the program, the processor 51 implements: determining the HARQ ID based on the time domain resource sequence number of the current transmission, the time domain resource offset, the time domain resource period, the number of HARQ processes, and the HARQ ID offset.

In an embodiment, when executing the program, the processor 51 implements: determining the HARQ ID based on the time domain resource sequence number of the current transmission, the time domain resource period, the number of HARQ processes, and the HARQ ID offset.

In an embodiment, when executing the program, the processor 51 implements: determining the HARQ ID based on the time domain resource sequence number of the current transmission, the time domain resource offset, the quantity of transmission times of the current transport TB, the time domain resource period, the number of HARQ processes, and the HARQ ID offset.

In an embodiment, when executing the program, the processor 51 implements: determining the HARQ ID based on the time domain resource sequence number of the current transmission, the quantity of transmission times of the current transport TB, the time domain resource period, the number of HARQ processes, and the HARQ ID offset.

In an embodiment, when executing the program, the processor 51 implements: determining the HARQ ID based on the time domain resource sequence number of the current transmission, the quantity of transmission times of the current transport TB, the time domain resource period, and the number of HARQ processes.

In an embodiment, when executing the program, the processor 51 implements: determining the HARQ ID based on the time domain resource sequence number of the current transmission, the time domain resource offset, the quantity of transmission times of the current transport TB, the time domain resource period, and the number of HARQ processes.

Embodiment 6

This embodiment of the present invention further provides a computer storage medium, including, for example, a memory 52 that is located in the network device/terminal and that stores a computer program as shown in FIG. 12, where the computer program may be executed by a processor 51 of the device, to perform the steps of the foregoing methods. The computer storage medium may be a memory such as an FRAM, a ROM, a PROM, an EPROM, an EEPROM, a flash memory, a magnetic surface memory, an optical disc, or a CD-ROM; or may be various devices including one of or any combination of the foregoing memories.

In an implementation, the computer storage medium includes a memory that is located in a network device and that stores a computer program, so that the computer storage medium provided in this embodiment of the present invention stores a computer program, where when run by a processor, the computer program performs: determining a time domain resource sequence number of a current transmission and a number of HARQ processes, and determining at least one type of information of time domain resource configuration information, a HARQ ID offset or a quantity of transmission times of a current transport TB, where the time domain resource configuration information includes a time domain resource offset and/or a time domain resource period of non-dynamic resource configuration; and determining a HARQ ID based on the time domain resource sequence number of the current transmission, the number of HARQ processes, and the at least one type of information of the time domain resource configuration information, the HARQ ID offset or the quantity of transmission times of the current transport TB.

In an embodiment, when run by a processor, the computer program performs: determining the HARQ ID based on the time domain resource sequence number of the current transmission, the time domain resource offset, the time domain resource period, and the number of HARQ processes.

In an embodiment, when run by a processor, the computer program performs: determining the HARQ ID based on the time domain resource sequence number of the current transmission, the time domain resource offset, the time domain resource period, the number of HARQ processes, and the HARQ ID offset.

In an embodiment, when run by a processor, the computer program performs: determining the HARQ ID based on the time domain resource sequence number of the current transmission, the time domain resource period, the number of HARQ processes, and the HARQ ID offset.

In an embodiment, when run by a processor, the computer program performs: determining the HARQ ID based on the time domain resource sequence number of the current transmission, the time domain resource offset, the quantity of transmission times of the current transport TB, the time domain resource period, the number of HARQ processes, and the HARQ ID offset.

In an embodiment, when run by a processor, the computer program performs: determining the HARQ ID based on the time domain resource sequence number of the current transmission, the quantity of transmission times of the current transport TB, the time domain resource period, the number of HARQ processes, and the HARQ ID offset.

In an embodiment, when run by a processor, the computer program performs: determining the HARQ ID based on the time domain resource sequence number of the current transmission, the quantity of transmission times of the current transport TB, the time domain resource period, and the number of HARQ processes.

In an embodiment, when run by a processor, the computer program performs: determining the HARQ ID based on the time domain resource sequence number of the current transmission, the time domain resource offset, the quantity of transmission times of the current transport TB, the time domain resource period, and the number of HARQ processes.

In an embodiment, when run by a processor, the computer program performs: sending signaling to a terminal, where the signaling carries at least one type of information of the number of HARQ processes, the time domain resource configuration information, and the HARQ ID offset; and the signaling includes one piece of RRC signaling, higher layer signaling or physical layer signaling.

In another implementation, the computer storage medium includes a memory that is located in a terminal and that stores a computer program, so that the computer storage medium provided in this embodiment of the present invention stores a computer program, where when run by a processor, the computer program performs: determining a time domain resource sequence number of a current transmission and a number of HARQ processes, and determining at least one type of information of time domain resource configuration information, a HARQ ID offset or a quantity of transmission times of a current transport TB, where the time domain resource configuration information includes a time domain resource offset and/or a time domain resource period; and determining a HARQ ID based on the time domain resource sequence number of the current transmission, the number of HARQ processes, and the at least one type of information of the time domain resource configuration information, the HARQ ID offset or the quantity of transmission times of the current transport TB.

In an embodiment, when run by a processor, the computer program performs: receiving signaling from a network device, and determining, based on the signaling, at least one type of the following information: the number of HARQ processes, the time domain resource configuration information, and the HARQ ID offset, where the signaling includes one piece of RRC signaling, higher layer signaling or physical layer signaling.

In an embodiment, when run by a processor, the computer program performs: determining the HARQ ID based on the time domain resource sequence number of the current transmission, the time domain resource offset, the time domain resource period, and the number of HARQ processes.

In an embodiment, when run by a processor, the computer program performs: determining the HARQ ID based on the time domain resource sequence number of the current transmission, the time domain resource offset, the time domain resource period, the number of HARQ processes, and the HARQ ID offset.

In an embodiment, when run by a processor, the computer program performs: determining the HARQ ID based on the time domain resource sequence number of the current transmission, the time domain resource period, the number of HARQ processes, and the HARQ ID offset.

In an embodiment, when run by a processor, the computer program performs: determining the HARQ ID based on the time domain resource sequence number of the current transmission, the time domain resource offset, the quantity of transmission times of the current transport TB, the time domain resource period, the number of HARQ processes, and the HARQ ID offset.

In an embodiment, when run by a processor, the computer program performs: determining the HARQ ID based on the time domain resource sequence number of the current transmission, the quantity of transmission times of the current transport TB, the time domain resource period, the number of HARQ processes, and the HARQ ID offset.

In an embodiment, when run by a processor, the computer program performs: determining the HARQ ID based on the time domain resource sequence number of the current transmission, the quantity of transmission times of the current transport TB, the time domain resource period, and the number of HARQ processes.

In an embodiment, when run by a processor, the computer program performs: determining the HARQ ID based on the time domain resource sequence number of the current transmission, the time domain resource offset, the quantity of transmission times of the current transport TB, the time domain resource period, and the number of HARQ processes.

In the several embodiments provided in this application, it should be understood that the disclosed terminal, network device, and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings, direct couplings, or communication connections between the components may be implemented through some interfaces, indirect couplings or communication connections between the devices or units, or electrical connections, mechanical connections, or connections in other forms.

The units described as separate parts may be or may not be physically separated. The part used as a display unit may be or may not be a physical unit. That is, the units may be located in the same place, or may be distributed to a plurality of network units. Some or all of the units need to be selected according to actual requirements to achieve the purpose of the solution of the embodiments.

In addition, in the embodiments of the present invention, the functional units may be all integrated into a processing unit. Alternatively, the units may be separately used as units. Alternatively, two or more units may be integrated into one unit. The integrated unit may be implemented in a hardware form, or may be implemented in the form of combining hardware and software functional units.

Persons of ordinary skill in the art should understand that all or some of the steps of the method embodiments may be implemented by a program instructing relevant hardware. The foregoing program may be stored in a computer-readable storage medium, and when being executed, the program performs the steps of the foregoing method embodiments. The foregoing storage medium includes: any media that can store program code, such as a removable memory, a ROM, a RAM, a magnetic disk, or an optical disc.

Alternatively, in the present invention, if implemented in the form of software functional modules and sold or used as independent products, the integrated modules may be stored in a computer-readable storage medium. Based on such an understanding, the technical solutions of the embodiments of the present invention essentially, or the part contributing to the prior art may be implemented in the form of a software product. The computer software product is stored in a storage medium and includes several instructions for instructing a computer device (which may be a personal computer, a server, a network device or the like) to perform all or some of the methods described in the embodiments of the present invention. The foregoing storage medium includes: various mediums that can store program code, such as a removable storage device, a ROM, a RAM, a magnetic disk, or an optical disc.

The descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a hybrid automatic repeat request (HARQ) identifier (ID), the method comprising: determining, by a network device, a HARQ ID of a transport block (TB) based on a time domain resource sequence number of the TB, a number of HARQ processes corresponding to the TB, a time domain resource period of a non-dynamic resource, and a number of transmission times of the TB; and receiving, by the network device, the TB from a terminal on the non-dynamic resource according to the HARQ ID, wherein the HARQ ID satisfies a formula, HARQ Process ID=[floor((t_temp−current_n)/T)] modulo B and wherein the HARQ Process ID is the HARQ ID of the TB, t represents the time domain resource sequence number of the TB, T represents the time domain resource period of the non-dynamic resource, t_temp is a parameter obtained by converting t based on a specific time unit, current n represents the number of transmission times of the TB, B represents the number of HARQ processes corresponding to the TB, floor represents rounding down and modulo represents modulo operation; or wherein the HARQ ID satisfies a formula, HARQ Process ID=[floor((t_temp−Pattern(current n)+Pattern(0))/T)] modulo B and wherein the HARQ Process ID is the HARQ ID of the TB, t represents the time domain resource sequence number of the TB, T represents the time domain resource period of the non-dynamic resource, t_temp is a parameter obtained by converting t based on a specific time unit, Pattern is a transmission pattern of a plurality of transmission of the TB, current n represents the number of transmission times of the TB, B represents the number of HARQ processes corresponding to the TB, floor represents rounding down and modulo represents modulo operation, wherein the number of transmission times of the TB is counted from number 0.

2. The method of claim 1, wherein a HARQ ID offset of the TB is further used by the network device to determine the HARQ ID.

3. The method of claim 2, wherein: the HARQ ID satisfies a formula, HARQ Process ID=[floor((t_temp−Pattern(current_n)+Pattern(0))/T)] modulo B+H offset; and the HARQ Process ID is the HARQ ID of the TB, t represents the time domain resource sequence number of the TB, T represents the time domain resource period of the non-dynamic resource, t_temp is a parameter obtained by converting t based on a specific time unit, Pattern is a transmission pattern of a plurality of transmission of the TB, current_n represents the number of transmission times of the TB, B represents the number of HARQ processes corresponding to the TB, H offset represents a HARQ ID offset of the TB, floor represents rounding down and modulo represents modulo operation, and the number of transmission times of the TB is counted from number 0.

4. A method for determining a hybrid automatic repeat request (HARQ) identifier (ID), comprising: determining, by a terminal, a HARQ ID of a transport block (TB) based on a time domain resource sequence number of the TB, a number of HARQ processes corresponding to the TB, a time domain resource period of a non-dynamic resource, and a number of transmission times of the TB; and sending, by the terminal, the TB to a network device according to the HARQ ID wherein the HARQ ID satisfies a formula, HARQ Process ID=[floor((t_temp−current n)/T)] modulo B and the HARQ Process ID is the HARQ ID of the TB, t represents the time domain resource sequence number of the TB, T represents the time domain resource period of the non-dynamic resource, t_temp is a parameter obtained by converting t based on a specific time unit, current n represents the number of transmission times of the TB, B represents the number of HARQ processes corresponding to the TB, floor represents rounding down and modulo represents modulo operation, or wherein the HARQ ID satisfies a formula, HARQ Process ID=[floor((t−temp−Pattern(current_n)+Pattern(0))/T)] modulo B and the HARQ Process ID is the HARQ ID of the TB, t represents the time domain resource sequence number of the TB, T represents the time domain resource period of the non-dynamic resource, t_temp is a parameter obtained by converting t based on a specific time unit, Pattern is a transmission pattern of a plurality of transmission of the TB, current_n represents the number of transmission times of the TB, B represents the number of HARQ processes corresponding to the TB, floor represents rounding down and modulo represents modulo operation, wherein the number of transmission times of the TB is counted from number 0.

5. The method of claim 4, wherein a HARQ ID offset of the TB is further used by the terminal to determine the HARQ ID.

6. The method of claim 5, wherein: the HARQ ID satisfies a formula, HARQ Process ID=[floor((t_temp−Pattern(current_n)+Pattern(0))/T)] modulo B+H offset; and the HARQ Process ID is the HARQ ID of the TB, t represents the time domain resource sequence number of the TB, T represents the time domain resource period of the non-dynamic resource, t_temp is a parameter obtained by converting t based on a specific time unit, Pattern is a transmission pattern of a plurality of transmission of the TB, current_n represents the number of transmission times of the TB, B represents the number of HARQ processes corresponding to the TB, H offset represents a HARQ ID offset of the TB, floor represents rounding down and modulo represents modulo operation, and the number of transmission times of the TB is counted from number 0.

7. The method of claim 4, wherein the number of HARQ processes and the time domain resource period of the non-dynamic resource are configured by radio resource control (RRC) signaling.

8. A network device comprising: a memory configured to store computer-executable instructions; and one or more processors in communication with the memory and configured to execute the computer-executable instructions to at least: determine a hybrid automatic repeat request (HARQ) identifier (ID) of a transport block (TB) based on a time domain resource sequence number of the TB, a number of HARQ processes corresponding to the TB, a time domain resource period of a non-dynamic resource, and a number of transmission times of the TB; and a communication interface configured to receive the TB from a terminal on the non-dynamic resource according to the HARQ ID wherein the HARQ ID satisfies a formula, HARQ Process ID=[floor ((t_temp−current n)/T)] modulo B and wherein the HARQ Process ID is the HARQ ID of the TB, t represents the time domain resource sequence number of the TB, T represents the time domain resource period of a non-dynamic resource configuration, t_temp is a parameter obtained by converting t based on a specific time unit, current_n represents the number of transmission times of the TB, B represents the number of HARQ processes corresponding to the TB, floor represents rounding down and modulo represents modulo operation, or wherein the HARQ ID satisfies a formula, HARQ Process ID=[floor((t_temp−Pattern(current_n)+Pattern(0))/r)] modulo B and the HARQ Process ID is the HARQ ID of the TB, t represents the time domain resource sequence number of the TB, T represents the time domain resource period of a non-dynamic resource configuration, t_temp is a parameter obtained by converting t based on a specific time unit, Pattern is a transmission pattern of a plurality of transmission of the TB, current_n represents the number of transmission times of the TB, B represents the number of HARQ processes corresponding to the TB, floor represents rounding down and modulo represents modulo operation, wherein the number of transmission times of the TB is counted from number 0.

9. The network device of claim 8, wherein: the HARQ ID satisfies a formula, HARQ Process ID=[floor((t_temp−Pattern(current_n)+Pattern(0))/T)] modulo B+H offset; and the HARQ Process ID is the HARQ ID of the TB, t represents a time domain resource sequence number of the TB, T represents the time domain resource period of a non-dynamic resource configuration, t_temp is a parameter obtained by converting t based on a specific time unit, Pattern is a transmission pattern of a plurality of transmission of the TB, current_n represents the number of transmission times of the TB, B represents the number of HARQ processes corresponding to the TB, H offset represents a HARQ ID offset of the TB, floor represents rounding down and modulo represents modulo operation, and the number of transmission times of the TB is counted from number 0.

10. A terminal comprising: a memory configured to store computer-executable instructions; one or more processors in communication with the memory and configured to execute the computer-executable instructions to at least: determine a hybrid automatic repeat request (HARQ) identifier (ID) of a transport block (TB) based on a time domain resource sequence number of the TB, a number of HARQ processes corresponding to the TB, a time domain resource period of a non-dynamic resource, and a number of transmission times of the TB; and a communication interface configured to send the TB to a network device according to the HARQ ID, wherein the HARQ ID satisfies a formula, HARQ Process ID=[floor((t_temp−current n)/T)] modulo B, and wherein the HARQ Process ID is the HARQ ID of the TB, t represents the time domain resource sequence number of the TB, T represents the time domain resource period of the non-dynamic resource, t_temp is a parameter obtained by converting t based on a specific time unit, current n represents the number of transmission times of the TB, B represents the number of HARQ processes corresponding to the TB, floor represents rounding down and modulo represents modulo operation, or wherein the HARQ ID satisfies a formula, HARQ Process ID=[floor((t−temp−Pattern(current_n)+Pattern(0))/T)] modulo B, and wherein the HARQ Process ID is the HARQ ID of the TB, t represents the time domain resource sequence number of the TB, T represents the time domain resource period of the non-dynamic resource, t_temp is a parameter obtained by converting t based on a specific time unit, Pattern is a transmission pattern of a plurality of transmission of the TB, current_n represents the number of transmission times of the TB, B represents the number of HARQ processes corresponding to the TB, floor represents rounding down and modulo represents modulo operation, wherein the number of transmission times of the TB is counted from number 0.

11. The terminal of claim 10, wherein: the HARQ ID satisfies a formula, HARQ Process ID=[floor((t_temp−Pattern(current_n)+Pattern(0))/T)] modulo B+H offset; and the HARQ Process ID is the HARQ ID of the TB, t represents the time domain resource sequence number of the TB, T represents the time domain resource period of the non-dynamic resource, t_temp is a parameter obtained by converting t based on a specific time unit, Pattern is a transmission pattern of a plurality of transmission of the TB, current_n represents the number of transmission times of the TB, B represents the number of HARQ processes corresponding to the TB, H offset represents a HARQ ID offset of the TB, floor represents rounding down and modulo represents modulo operation, and the number of transmission times of the TB is counted from number 0.

12. The terminal of claim 10, wherein the number of HARQ processes and the time domain resource period of the non-dynamic resource are configured by radio resource control (RRC) signaling.

* * * * *